(12) United States Patent
Fudali et al.

(10) Patent No.: US 8,392,308 B2
(45) Date of Patent: Mar. 5, 2013

(54) ELECTRONIC COLLATERAL MANAGEMENT SYSTEM AND METHOD

(75) Inventors: Harold Fudali, East Brunswick, NJ (US); Glenn Hett, Howell, NJ (US); Dick Dervan, Wayside, NJ (US); Lincoln Barr, Huntington, NY (US); Maureen Ruggeberg, Huntington, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1113 days.

(21) Appl. No.: 12/335,721

(22) Filed: Dec. 16, 2008

(65) Prior Publication Data

US 2009/0119229 A1    May 7, 2009

Related U.S. Application Data

(63) Continuation of application No. 09/948,205, filed on Sep. 6, 2001, now Pat. No. 7,480,632.

(51) Int. Cl.
*G06Q 40/00* (2006.01)
(52) U.S. Cl. ............................ 705/36 R; 705/35
(58) Field of Classification Search ............. 705/35, 705/37, 36 R
See application file for complete search history.

(56) References Cited

U.S. PATENT DOCUMENTS 5,563,783 A * 10/1996 Stolfo et al. ............... 705/7.25
6,460,021 B1 * 10/2002 Kirksey .................... 705/35

* cited by examiner

*Primary Examiner* — Ojo O Oyebisi
(74) *Attorney, Agent, or Firm* — Goodwin Procter LLP

(57) ABSTRACT

A process for allocating specific assets from a pool of assets to secure a liability. Information concerning each of the assets in the pool of assets is received from at least two sources. A set of validation rules is applied to the information for each asset in the pool of assets and those assets which do not meet the validation rules are rejected. A price is assigned to each non-rejected asset. A subset of the non-rejected assets is allocated to the liability as a function to collateralize the liability.

77 Claims, 10 Drawing Sheets

Figure 7

Grade Definition File                                    ←22

| | | | A | B | C | D | |
|---|---|---|---|---|---|---|---|
| Investment Bank: AX30390 | | | | | | | |
| Master Custodian: BYD 3039 | | | | | | | |
| Asset Grade | | | A | B | C | D | |
| Default Coupon Rate | | | 1.6% | 7.5% | 4.8% | 8.9% | ⎤ Default |
| Default Maturity Date | | | 1/1/2010 | 1/1/2015 | 1/1/2020 | 1/1/2030 | ⎦ Values |
| Price Discount | | | 4.0% | 10.0% | 15.0% | 20.0% | ⎤ |
| Price Spread | | | 98.5% | 95.5% | 93.5% | 91.5% | |
| Coupon Spread | | | 0.05 | 0.05 | 0.1 | 0.15 | Pricing Data |
| Minimum Index % | | | 80.0% | 80.0% | 80.0% | 80.0% | |
| Maximum Index % | | | 120.0% | 120.0% | 120.0% | 120.0% | |
| Price Maturity Date + months | | | 3 | 5 | 7 | 9 | |
| Price Maturity Date - months | | | 3 | 5 | 7 | 9 | ⎦ |
| Pricing Service | | | Bloomberg | Bloomberg | Bloomberg | Bloomberg | ⎤ |
| First Pricing Option | | | Vendor | Vendor | Vendor | Vendor | Pricing Rules |
| Second Pricing Option | | | Seller | Seller | Seller | Seller | |
| Default Index % | | | 98.5% | 96.5% | 93.5% | 91.5% | ⎦ |
| Allocation Order | | | 1 | 2 | 3 | 4 | — Allocation |

Investor Profile

Investor: JW 300392  Investment Bank: AX 30390

|  | Grade A | Grade B | Grade C | Grade D |
|---|---|---|---|---|
| Margin % | 105% | 106% | --- | 107% |
| Haricut % | 5% | 6% | --- | 7% |
| Allocation Order | 3 | 1 | --- | 2 |
| Seller Pricing | Y | Y | N | Y |

Figure 10

Collateral Management System

Investor Allocation Report

Production Date 12/5/00

| Investor Name | GE Corporation |
| --- | --- |
| Type | Residential Loan Collateral |
| Trade Number | 96CLU670 |

G. Number 123

28

| Print Date: | 12/5/00 |
| --- | --- |
| Investor Amount | 87,000,000.00 |
| Required Amount | 93,090,000.00 |
| Pricing Source: | Bloomberg |

| Custodian | Pod Number | Loan Number | Coupon | Price % | Discount % | Status | Final % | Maturity Date | Asset Amount | Market Value |
| --- | --- | --- | --- | --- | --- | --- | --- | --- | --- | --- |
| 108 | SM97 | 8162798 | 9.75% | 104.0625% | 0.00% | Pre-allocated | 104.0625% | 5/1/30 | 324,541.42 | 337,725.92 |
| 108 | SM97 | 8094853 | 9.00% | 104.5313% | 0.00% | Pre-allocated | 104.5313% | 4/1/15 | 321,525.68 | 336,094.82 |
| 108 | SN16 | 6723792527 | 9.00% | 103.5469% | 0.00% | Pre-allocated | 103.5469% | 7/1/30 | 315,827.17 | 327,029.18 |
| 108 | SN16 | 6327476449 | 8.88% | 100.9531% | 0.00% | Pre-allocated | 100.9531% | 5/1/30 | 309,474.76 | 312,424.40 |
| 108 | SN16 | 6088097610 | 8.38% | 100.9531% | 0.00% | Pre-allocated | 100.9531% | 6/1/30 | 308,914.15 | 311,856.49 |
| 108 | SM61 | 6902985360 | 9.61% | 99.1687% | 0.00% | Pre-allocated | 99.1687% | 3/15/24 | 305,412.66 | 302,874.06 |
| 108 | SM97 | 8111225 | 9.13% | 103.5469% | 0.00% | Pre-allocated | 103.5469% | 5/1/30 | 292,373.85 | 302,743.98 |
| 108 | SN16 | 6513103546 | 8.25% | 100.9531% | 0.00% | Pre-allocated | 100.9531% | 6/1/30 | 299,616.08 | 302,471.80 |
| 108 | SM97 | 8076781 | 9.75% | 100.9531% | 0.00% | Pre-allocated | 100.9531% | 4/1/30 | 288,135.76 | 300,977.37 |
| 108 | SN16 | 8076781 | 8.88% | 100.9531% | 0.00% | Pre-allocated | 100.9531% | 6/1/30 | 298,006.89 | 300,647.27 |

ELECTRONIC COLLATERAL MANAGEMENT SYSTEM AND METHOD

RELATED APPLICATIONS

This application is based upon and claims priority to U.S. Provisional Application Ser. No. 60/237,020, filed Sep. 29, 2000 entitled "AN ELECTRONIC COLLATERAL MANAGEMENT SYSTEM AND METHOD". The entire contents of the foregoing provisional application is incorporated by reference herein.

BACKGROUND OF THE INVENTION

The present invention relates to a process for receiving and managing assets to be used to collateralize a liability (e.g., a loan), and in particular to a process of receiving data regarding those assets from a plurality of sources in order to allocate the assets as collateral to secure the liability.

DESCRIPTION OF THE RELATED ART

When an investor is asked to make a financial investment, it typically requires collateral to create a security interest and thereby protect his or her investment. Large investments can be backed by a pool of assets, for example commercial mortgages, and trusted third party custodians are frequently hired to record and monitor transactions.

By way of example, a bank or a mortgage company gives residential mortgages to home-buyers and commercial mortgages to companies purchasing office space and the like. The bank or mortgage company (hereinafter referred to as a "mortgage bank"), however, may not have sufficient capital to lend to all of these mortgagors. Mortgage banks therefore borrow capital from other banks (hereinafter referred to as "warehouse banks") that have greater capital resources and can fund the mortgages. Mortgage banks have a financial interest in granting as many mortgages as possible because they earn processing fees upon closing of each mortgage and because they earn interest on each mortgage. The greater the number of mortgages granted, the higher their income.

In order to increase the number of mortgages they can provide, mortgage banks look to sell existing mortgages to third parties (hereinafter referred to as "takeout investors") to recoup the capital lent to mortgagors as soon as possible. By selling existing mortgages to takeout investors, the mortgage bank can return capital to warehouse banks, keep its transaction fees and a percentage of interest on each transaction and grant additional mortgages on an ongoing basis.

This process can best be understood with reference to FIG. 1. When a takeout investor 12 expresses interest in purchasing mortgages from a mortgage bank 10, a managing party (hereinafter referred to as a "primary custodian" 14) receives the mortgages and related papers from the mortgage bank 10. The document transfer results in a bailment in that all documents and details relating to the mortgages are received and retained in the primary custodian's 14 possession. After the primary custodian 14 receives the mortgages from the mortgage bank 10, it typically securitizes them, classifying mortgages of similar tenor (e.g., 30 year fixed rate residential mortgages with a 7% coupon) together. The primary custodian reviews the mortgage-related documents to make sure that they are in proper form.

After the primary custodian 14 has reviewed the documents and created a database of information relating to the mortgages, he provides the mortgages to the takeout investor 12 for review. The mortgages are forwarded to the takeout investor 12 along with a bailee letter stating that the mortgages are owned by the mortgage bank 10 and are being provided to the takeout investor for evaluation and potential purchase purposes only.

The takeout investor 12 typically reviews the mortgages for thirty to forty-five days to determine whether or not to purchase them. During this period, the mortgage bank's 10 money is tied up in these mortgages and it cannot use that money to grant other mortgages. To overcome this problem, the mortgage bank 10 (who still retains title to the mortgages until the takeout investor 12 decides to purchase them) looks to finance the mortgages during this interim period in order to raise additional capital to grant additional mortgages.

To this end, and substantially as shown in FIG. 2, the mortgage bank 10 locates another party (typically, but not necessarily, an "investment bank" 16) to supply capital in exchange for a pledge of the mortgages for the thirty to forty-five day period. The investment bank effectively provides a loan to the mortgage bank which is collateralized by the mortgages. In some cases a three way deal known as a forward take out agreement will be entered into between the mortgage bank 10, the investment bank 16 and a third party (not shown in FIG. 2) under which the mortgage bank 10 receives a loan from the investment bank 16 which is collateralized by the mortgages and the third party agrees to purchase the mortgages from the investment bank 16 in the event that the mortgage bank 10 defaults on its obligation to pay back the loan. Whatever arrangement is made, the mortgage bank 10 receives money from the investment bank 16 which it can use to issue or originate additional mortgages.

In order to collateralize the loan, the mortgage bank 10 provides blank assignment sheets with the mortgages' documentation to the primary custodian 14. In the event that the mortgage bank 10 defaults on its loan obligation, the primary custodian will complete the blank assignment sheets and transfer title to the investment bank 16 or, in the event of that a forward take out agreement has been entered into, to the third party who has agreed to purchase the mortgages in the event of a default by the mortgage bank 10.

As shown in FIG. 3, the investment bank 16 enters into a further transaction with an investor 18 (typically a large institutional investor such as GE). In this transaction, the investor 18 provides a loan to the investment bank 16, typically equal to the amount of money the investment bank 16 loaned to the mortgage bank 10, but at a lower interest than the investment bank 16 is receiving from the mortgage bank 10. The investment bank 16 earns money on the spread between the two rates and by charging various processing fees to the institutional investor. The investment bank 16 also frees up further capital to make additional loans.

In the foregoing description, each individual mortgage is treated as a single asset sold or pledged from party to party. In fact, the transactions typically involve a large number of mortgages, indeed revolving sets of mortgages, which are sold as a package known as whole loans. For example, the investor 18 may provide a $10,000,000.00 loan for a period of 30 days at an interest rate of 5%. While the investor 18 may not be concerned with the individual mortgages that secure its loan, it wants to be sure that the quality and total value of the mortgages in the package is sufficient to protect its investment.

Some system is needed to ensure that the investor 18 will always have a portfolio of mortgages meeting criteria set by the investor 18 (and agreed to by the investment bank 16) that will protect their investments. To this end, and substantially as shown in FIG. 4, a custodian (hereinafter referred to as a "master custodian" 20) typically electronically manages a large number of trust receipts backed by mortgages (for example, 100 mortgages worth a total of $100,000,000.00) provided by the primary custodian 14. The master custodian 20 selects a subset of trust receipts backed by mortgages (using agreed to criteria) which is then used to secure the investor's investment. The investor 18 is then given a trust receipt backed report certified by the master custodian 20 and backed by a trust receipt held by the master custodian 20 stating that there are sufficient assets in the subset of trust receipts assigned to the investor 18 to secure the investor's 18 investment in accordance with the criteria set by that investor.

While this provided some assurance to the investor 18, the details of the particular mortgages which collateralized its investment were not known to it. The investor had to simply rely on the assurances given by the master custodian 20.

There is a need in the art for a system to manage the multitude of details relating to collateral transactions including, but not limited to, ownership and value. A system is needed which assigns assets to liabilities efficiently and can provide investors with details of specific collateral assets assigned as security interests for their financial investments.

SUMMARY OF THE INVENTION

A process for allocating specific assets from a pool of assets to secure a liability, the process comprising:

receiving information concerning each of the assets in the pool of assets, information for at least some of the assets in the pool of assets having been received from at least two sources;

applying a set of validation rules to the information for each asset in the pool of assets and rejecting those assets which do not meet the validation rules;

assigning a price to each non-rejected asset; and allocating a subset of the non-rejected assets to the liability to as a function of the assigned prices to collateralize the liability.

The allocation is preferably made as a function of the prices assigned to the individual assets which are allocated, the individual prices assigned to the individual assets which are not allocated and the cumulative prices of the assets which are allocated. However, any subset of these parameters and/or other parameters can be used.

The information concerning each asset is preferably received in electronic form. Each asset will have a plurality of fields of information associated with the asset. This makes it easy to validate each asset by examining the information in the fields for the asset being validated. In the preferred embodiment, any asset which is missing a required field will be rejected. The required field is considered missing if either the field itself does not exist or if the field exists but no information is contained in that field. In the preferred embodiment, a set of mismatch rules are followed to correct any discrepancies between the first and second asset information files, and a predetermined set of rules are followed to complete missing fields.

Once the assets are validated (i.e., are not rejected), a price is assigned to the non-rejected assets. In the preferred embodiment, some of the non-rejected assets are assigned a price as a function of their fair market value and others are priced by an alternative method, for example preset pricing. The fair market value is preferably determined with reference to an agreed upon, typically an industry accepted, standard. In the preferred embodiment, non-rejected assets are classified by grade and the fair market value of each asset is priced as a function of its grade.

The agreed to standard is preferably a publicly available set of indices corresponding to different types of assets. Each asset is matched with a corresponding one of the indices. Any asset with an index that does not fall within an agreed upon predetermined range is not priced and will not be allocated.

In the preferred embodiment, the owner of the pool of assets enters into a trade with a second party under which the owner of the assets takes on a liability (e.g., accepts a loan and agrees to repay the loan) and agrees to collateralize the liability with assets from the pool of assets. The second party indicates which grades of assets can be allocated to collateralize the liability.

In the preferred embodiment, one or more over-collateralization factors are used to price the assets in a conservative way (to discount the fair market value of the asset) so as to ensure that the assets allocated to the liability will have a value sufficient to over-collateralize the liability.

In the preferred embodiment, a price is assigned to some of the assets as a function of the coupon rate of the asset. In order to effectively discount the price assigned to the asset (and thereby over-collateralize the liability) a coupon spread is applied to discount the coupon rate before the asset is priced.

In some cases the price assigned to at least some of the assets is a function of a maturity date of the asset (e.g., the maturity date of a mortgage). In such a case, the prices is preferably assigned to each asset by:

examining an independent source's list of similar assets to select a subset of the independent source's list of assets which have a maturity date that falls within a certain range of the maturity date of the asset to which a price is being assigned;

identifying those assets of the subset of similar assets which have a coupon rate which is closest to, but does not exceed, the discounted coupon rate of the asset to which a price is being assigned;

determining a matched price as being equal to the lowest price of the so identified similar assets; and assigning the price of the asset to which a price is being assigned as a function of the matched price.

Information data, including reports, are preferably periodically provided to the second party showing the specific assets which have been allocated to its trade.

Information concerning trades (e.g., loans which are collateralized by the assets) is preferably received in the form of an electronic file identifying the parties to the trade and various parameters relating to the trade including the amount of the trade (e.g., the amount of the liability that is taken on by the owner of the assets), the parties to the trade, etc. This information is validated before allocating the subset of the non-rejected assets as collateral.

The invention is also directed towards a process for collateralizing a plurality of liabilities by allocating specific assets from a pool of assets to secure the liabilities, the process comprising:

(a) maintaining a non-collateralized balance for each of the liabilities, the non-collateralized balance for any given liability indicating the amount of that liability which has not yet been collateralized by one or more of the assets;

(b) allocating the assets to the liabilities by:
  (1) determining which of the liabilities has the highest non-allocated balance;
  (2) allocating a non-allocated asset to the liability having the highest non-allocated balance from a permissible grade for that liability and reducing the non-allocated balance of the liability to which the asset has been allocated by a price which has been assigned to the allocated asset;
  (3) repeating acts (b)(1) and (b)(2) until each of the liabilities has been fully collateralized or until there are no more assets to allocate, whichever comes first.

BRIEF DESCRIPTIONS OF THE DRAWINGS

For the purpose of illustrating the invention, there is shown in the drawings several embodiments which are presently preferred, it being understood, however, that the invention is not limited to the precise arrangements and instrumentalities shown.

FIG. 7 shows an example grade definition file 22 in accordance with the principles of the present invention.

FIG. 10 is a sample report generated by the master custodian and provides details regarding a transaction between the investment bank, the investor and the master custodian.

DETAILED DESCRIPTION OF THE INVENTION

Figure 1:
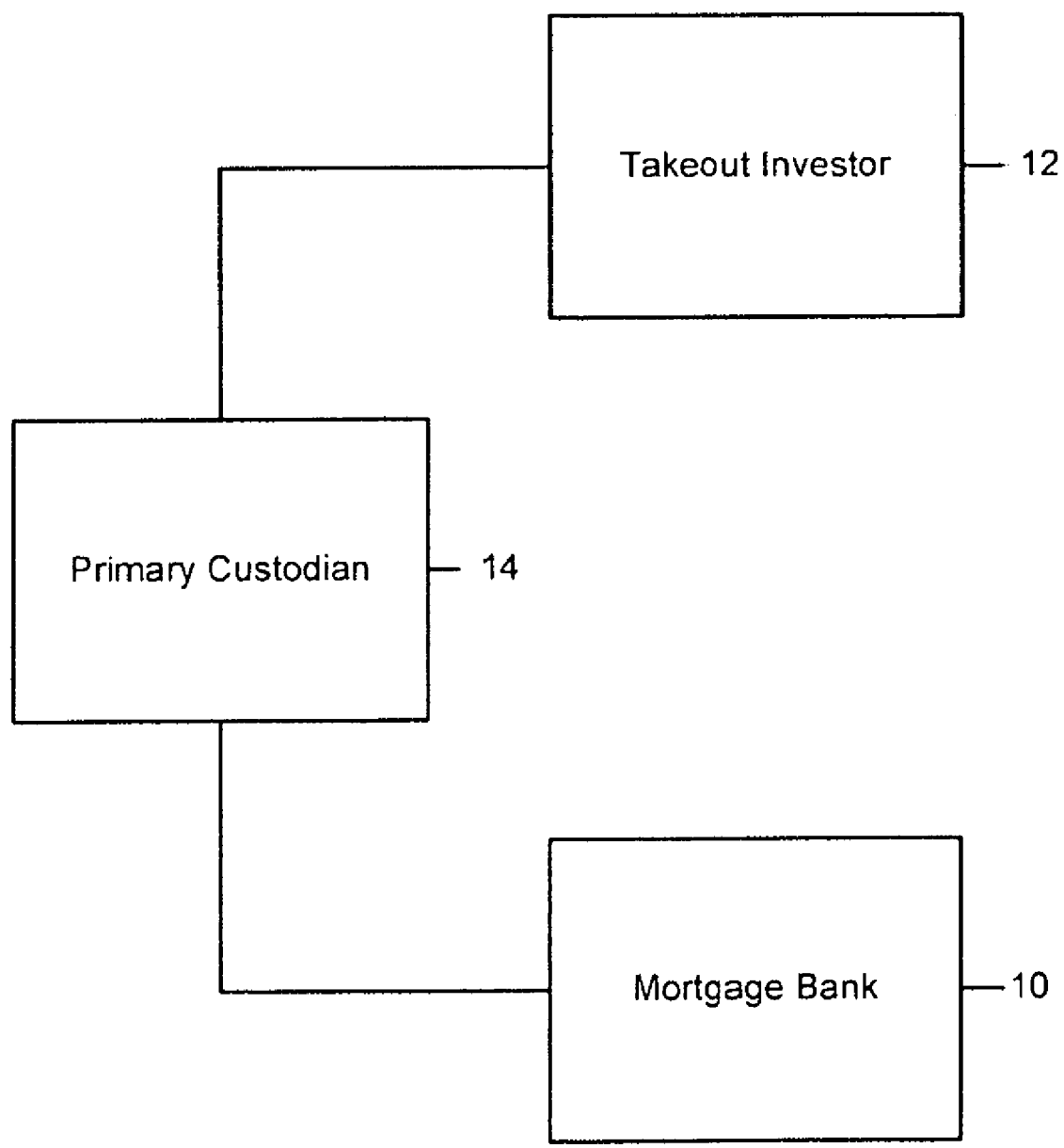
FIG. 1 is an example of a prior art arrangement showing the relationship between the mortgage bank, the primary custodian and the takeout investor.
Figure 2:
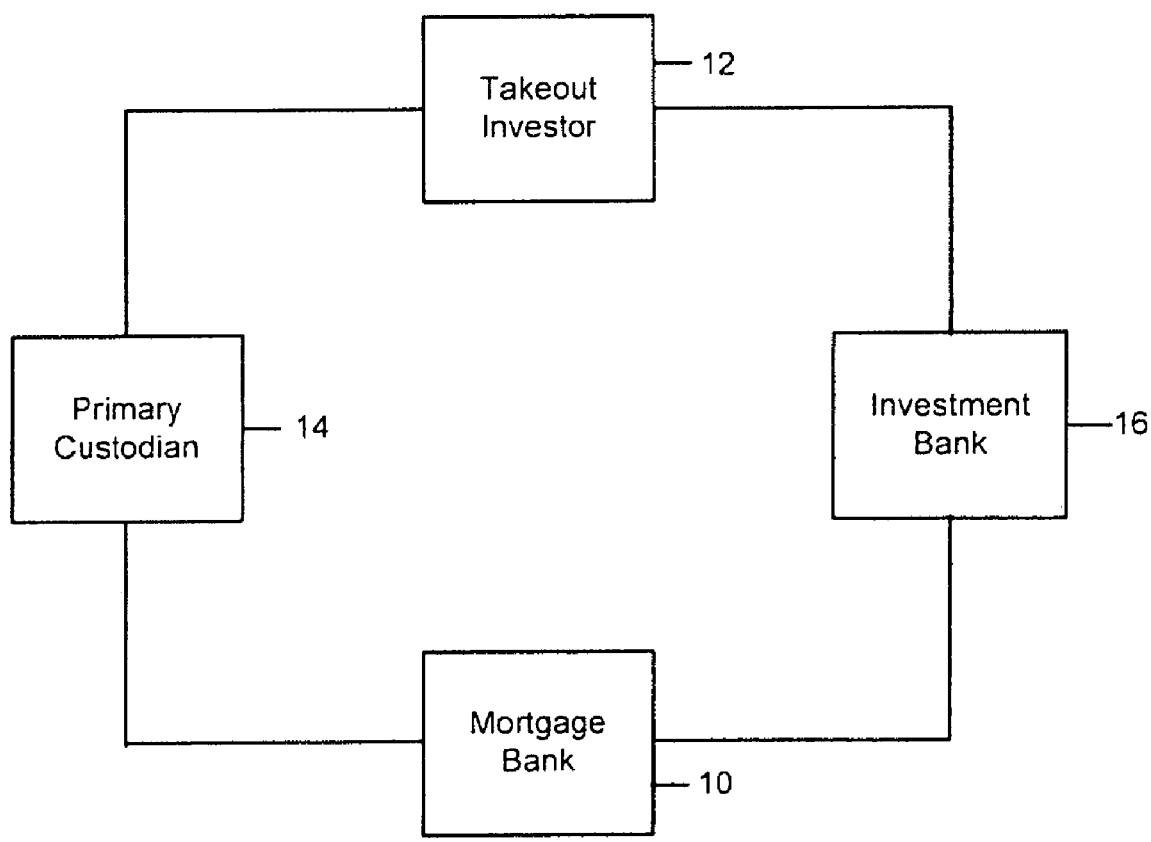
FIG. 2 is an example of a prior art arrangement showing the relationship between the mortgage bank, the primary custodian, the takeout investor and the investment bank.
Figure 3:
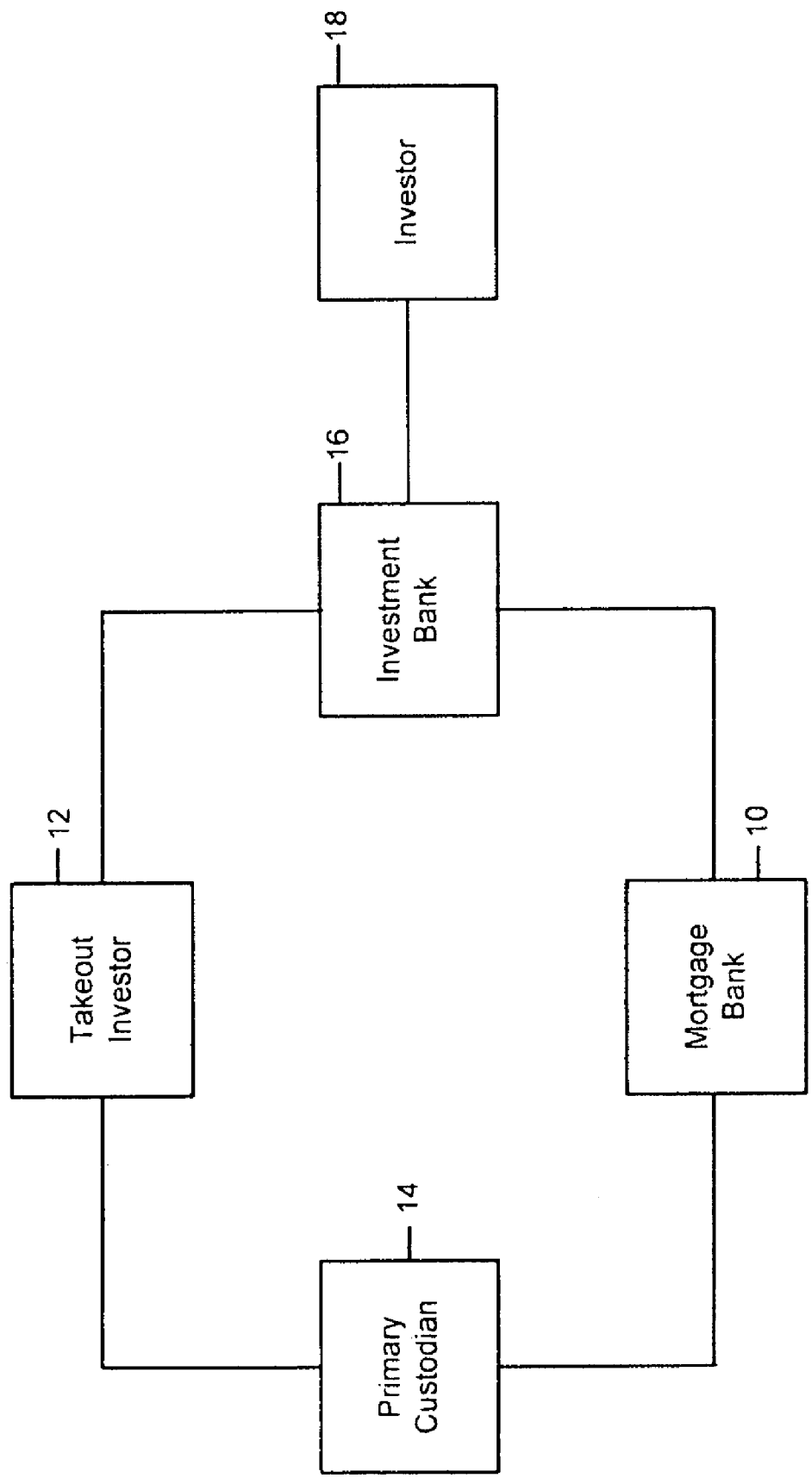
FIG. 3 is an example of a prior art arrangement showing the relationship between the mortgage bank, the primary custodian, the takeout investor, the investment bank and the investor.
Figure 4:
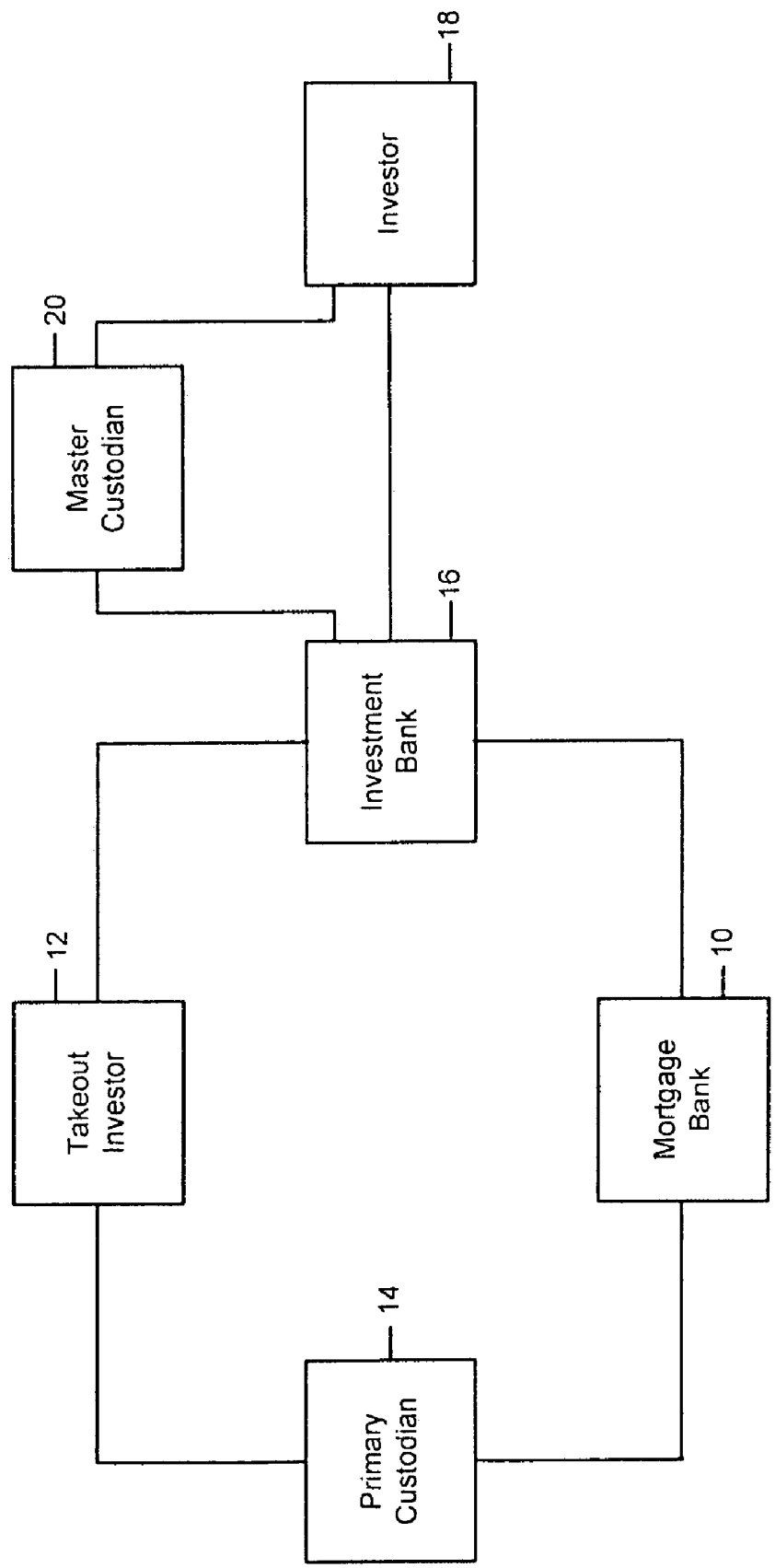
FIG. 4 is an example of a prior art arrangement showing the relationship between the mortgage bank, the primary custodian, the takeout investor, the investment bank, the investor and the master custodian.
Figure 5:
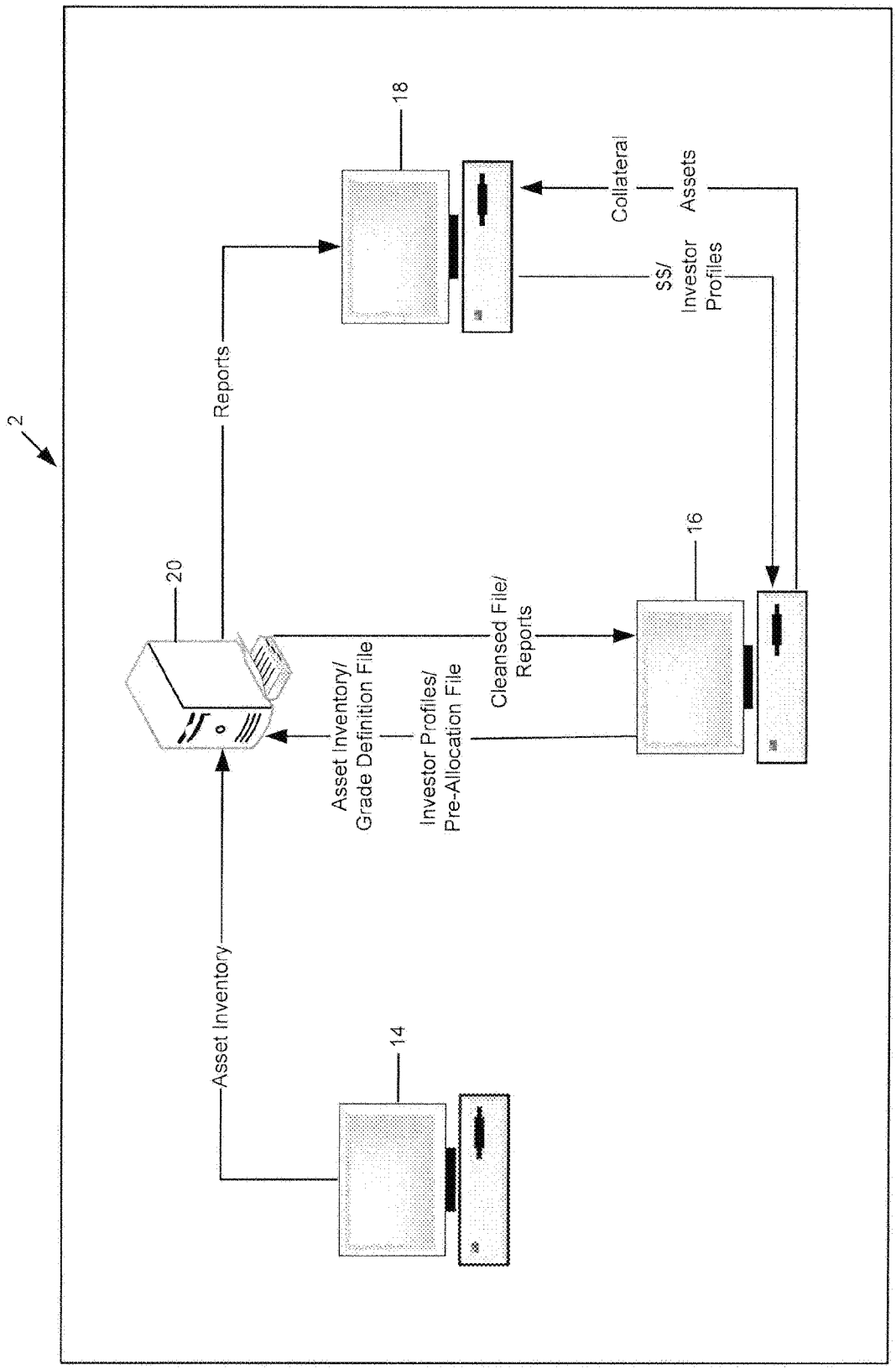
FIG. 5 is a schematic diagram of the asset allocation system of the present invention.

Referring now to the drawings wherein like numerals indicate like elements, there is shown in FIG. 5 a collateral management system constructed in accordance with the principles of the present invention and designated generally as 2. Collateral management system 2 allows a master custodian 20 to receive information concerning assets owned by the investment bank 16 and information concerning trades made between the investment bank and the investor 18. The information allows the master custodian 20 to allocate a portion of those assets to each trade in accordance with a set of parameters agreed to by the investment bank 16 and investor 18 in connection with the trade in question. In the preferred embodiment, the collateral management system 2 also includes a primary custodian 14 (or other source) who sends asset information to the master custodian 20 to be used to authenticate asset information received from the investment bank 16 before the investments are allocated.

The information is preferably sent between the various parties 14-20 over any appropriate communication network, for example, the Internet. If desired, the information can be manually transferred from entity to entity.

A master custodian 20 is charged with allocating sufficient assets to each trade to fully collateralize the trade in accordance with certain standards agreed to between the investment bank 16 and the investor 18. Since the pool of assets used for allocation of collateral for each trade varies on a periodic basis (e.g., day to day), the allocation process is repeated on a periodic basis (e.g., every day).

In a typical example, a trade takes place between the investment bank 16 and the investor 18. The investor 18 lends a predetermined amount of money (e.g., $10 million) to the investment bank 16 for a preset period (e.g., 30 days) at a predetermined interest rate (e.g., 5%). This investment is to be collateralized by mortgages selected from a larger pool of mortgages (e.g., $100 million dollar pool) provided by the investment bank 16. Since the pool of mortgages typically changes on a day to day basis, the specific mortgages allocated to the $10 million trade may also change on a day to day basis.

At the time the trade is entered into, the investment bank 16 and the investor 18 have agreed on the grades of assets which can be used to collateralize the trade. Examples of different asset grades include commercial mortgages, residential mortgages and asset-backed trust receipts. Further, the amount by which the liability must be over-collateralized is determined. For example, the parameters of the trade may require that a $10 million loan be collateralized with mortgages having a market value of $11 million.

Before the allocation process of the invention can be carried out, certain rules to be applied must be set up for each investment bank 18 (the system is capable of collateralizing multiple trades with a single investor and/or multiple trades with a plurality of investors). In the preferred embodiment, there is a single set of rules set up for all trades made by any given investment bank 18. Alternatively, the system can be set up so that each particular investment bank 18 can select a respective set of rules for each of its trades.

Set Up Parameters

The rules of the investment bank are set forth in a grade definition file, an example of which is shown in FIG. 7. Details of the grade definition file will be set forth below. It is sufficient at this point to state that the number of asset grades (A-D in the example shown) and the definition of each asset grade (e.g., grade A can be cash, grade B can be commercial mortgages, etc.) and various pricing and allocation rules are set forth.

Figure 8:
FIG. 8 shows an example investor profile in accordance with the principles of the present invention.

In addition to the grade definition files, an investor profile, an example of which is shown in FIG. 8 and designated generally as 24, is preferably provided for each investor. While the details of the investor profile are set forth below, it is sufficient to state at this point that the investment profile will indicate the grades of assets which the investor is willing to have used to collateralize its trades, and certain over-collateralization and allocation rules to be applied to its trades.

Overview of the Production Process

Figure 6:
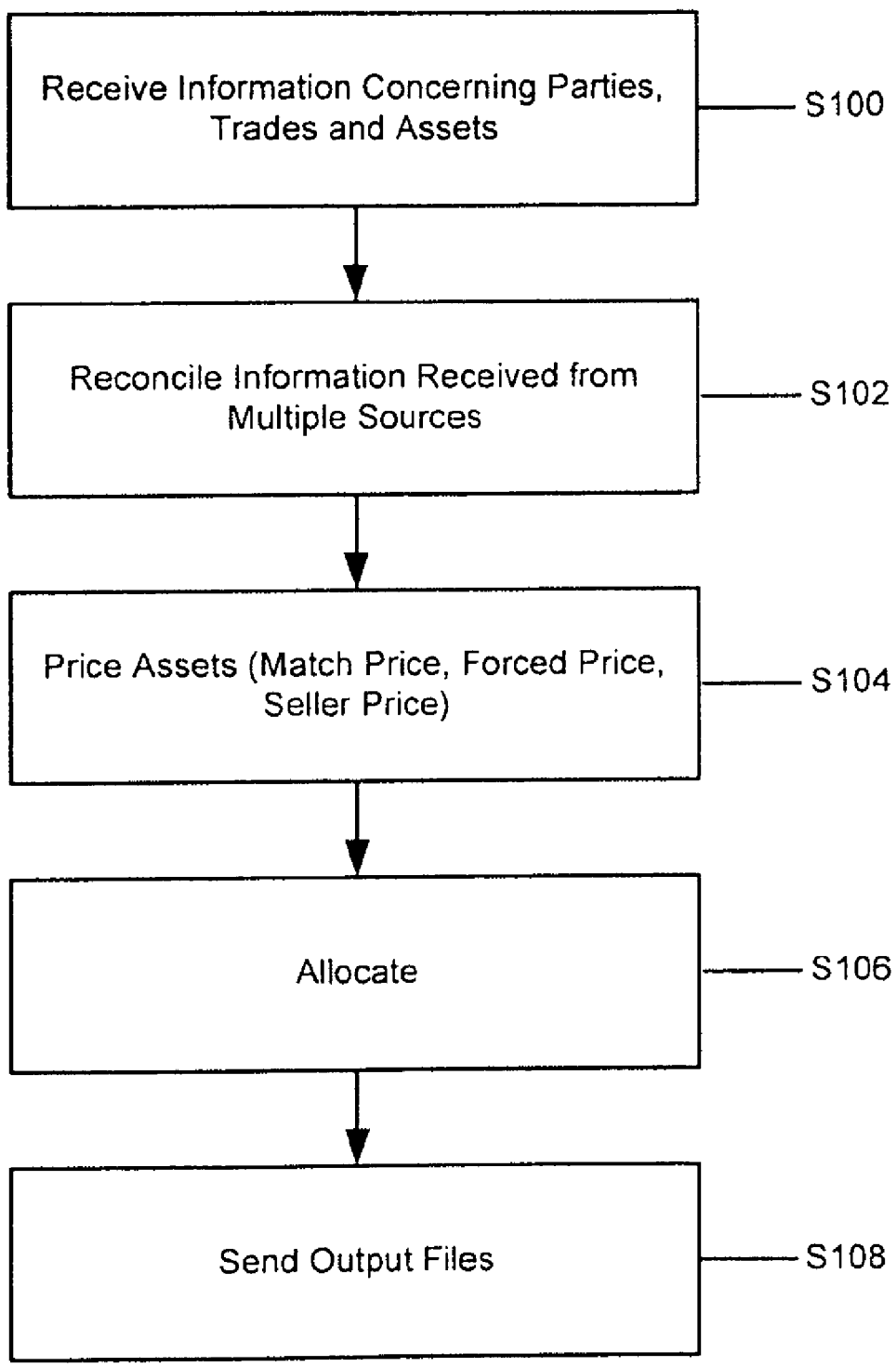
FIG. 6 is a flowchart describing the steps involved with employing the principles of the present invention.

While the investment and investor profiles are relatively static (they are rarely changed), the entry of assets into the system and the pricing and allocation of those assets to collateralize trades occurs on a periodic (normally daily) basis. This production process, which is carried out by the master custodian 20, is shown in FIG. 6.

The production run process starts at step S100 wherein information concerning the various trades which have been booked that day, the parties to that trade (a single investment bank 16 may have multiple trades with a single investor and/or multiple trades with different investors) and the assets owned by each of the investment banks are received.

The information concerning the assets and the trades preferably comes from multiple sources so that the master custodian can cross-reference and validate the accuracy of the information received. After this information has been received, the master custodian 20 reconciles the information to determine discrepancies in the information (step S102). Discrepancies concerning the assets owned by the investment bank 16 will preferably be reported to the investment bank and, depending upon the type of discrepancy, assets may be rejected and not used to collateralize any trade.

At the end of the reconciliation process, the master custodian 20 will have a pool of assets which can be used to collateralize each trade. There is a high level of confidence that the asset data used to collateralize each trade will be accurate, since the data concerning those assets have been received from separate sources.

Before the automatic allocation process takes place each of the individual assets are priced (typically based on the fair market value of the assets) in step S104.

Once the assets have been priced, they are allocated (Step S106) to each of the trades to ensure that each trade is fully collateralized (or over-collateralized as per the requirements of the trade. Some assets may be pre-allocated (and, if permitted, pre-priced).

Finally, after the allocation has been completed, the master custodian sends appropriate reports to the investment bank 16 and/or the investor 18 to inform them of the results of the allocation (step S108).

The details of each of the foregoing steps in the process will now be described below.

Production Runs

The collateral management system 3 preferably executes multiple production runs concurrently for a plurality of investment banks 16.

A production run may include the processes of validating assets and trades, adjusting asset prices, and allocating assets to collateralize a plurality of trades. Additionally, output files including data-files, e-mail, printed reports and faxes are preferably generated and electronically delivered during a single production run. The order in which processes are executed in a single production run are defined in part by the instructions provided by the investment bank 16 and/or agreed to between the investment bank 16 and master custodian 20 for a given production run.

Grade Definition File

A respective grade definition file is set up for each investment bank 16 and is used to price and allocate assets of that investment bank 16.

FIG. 7 shows a sample grade definition file designated generally as 22. At the top of the grade definition file 22 is an identification section identifying the investment bank 16 and master custodian 20 used for trades made by that investment bank. Below the identification section are various parameters which are used by the collateral management system 2 to price and allocate assets.

The grade definition file 22 shows that the investment bank AX 30390 has four grades of assets, A, B, C and D. The investment bank has setup various parameters which will be used to price its assets and to determine the order in which to allocate assets from different grades to a given liability.

The sections of the grade definition file 22 identified as "Default Values", "Pricing Data", and "Pricing Rules" are used to price the assets, following the procedures described below. These various parameters are used to assign a price to each asset which is preferably somewhat less than the fair market value of the asset.

Finally, the grade definition file includes a default allocation order for allocating assets from different grades to a given liability. In the embodiment illustrated in FIG. 7, grade A assets are first applied to collateralize liability. Once these assets are depleted, assets from grade B are used to collateralize the liability, followed, in order, by assets from grade C and then grade D.

The grade definition file defines the standard parameters under which the investment bank 16 is willing to collateralize loans with investors 18.

Investor Profile

While the investment bank 16 sets forth the general parameters in which it is willing to collateralize a loan, the collateral management system 2 preferably permits minor adjustments to these parameters through an investment profile 24 illustrated, by way of example, in FIG. 8. The investment profile 24 effectively permits the investor 18 to vary the amount of over-collateralization of its loans, to indicate which grade of assets may be used to collateralize its loans, and the order of the grades of assets used to collateralize its loans.

To this end, the investor profile includes an allocation order which, if provided, overrides the default allocation order selected by the investment bank 16 and set forth in the grade definition file 22. In the example shown in FIG. 8, the investor (JW 300392) has indicated that he will only accept assets from grades A, B and D and will not accept assets from grade C (as indicated by the dash in the column labeled "Grade C" and the row labeled "AllocationOrder"). He has also indicated that the allocation order should be changed from the default allocation order (A, B, C, D) to grade B, followed by grade D followed by grade A.

The investment profile also indicates whether or not the particular investor will permit seller pricing (i.e., will permit the investment bank 16 to set a price for a given asset in lieu of fair market value pricing of the asset). In the example shown, the investor has indicated that he will permit seller pricing of grades A, B and D.

While the investor is not permitted to directly change the pricing parameters set forth in the grade definition file, he is permitted to adjust the degree to which his trade (actually, the liability taken on by the investment bank 16) must be over-collateralized. He can do this by setting a margin percentage by which a loan must be over-collateralized and/or a haircut percentage by which the price assigned to the assets must be discounted.

Asset and Trade Validation

As noted above, the investment bank 16 and primary custodians 14 preferably submit data to the collateral management system 2 regarding inventories of the investment bank's assets. All data which is received by the collateral management system 2 is preferably validated before the allocation process begins. The validation process is based on a set of rules which are defined by the investment bank and agreed to by the master custodian 20. For example, the master custodian 20 will supply the list of specific fields to the investor bank 16 and primary custodian 14 of data that must be present and properly entered.

If assets are listed twice in an asset data file, then preferably the master custodian 20 rejects both assets. Collateral management system 2 may require that all assets which are submitted from an investment bank 16 have a corresponding asset entry by the investment bank's primary custodian 14. In the event that both the investment bank 16 and the primary custodian 14 submit data regarding an asset but there is a discrepancy in the data, there are preferably mismatch rules which are applied for handling the discrepancy. If certain records have missing data, for example the coupon rate or maturity date for an asset is not included in the data, default values (see the grade definition file of FIG. 7) are preferably used.

Collateral management system 2 will preferably also validate trade-related data. On any given day, an investment bank 16 will submit data regarding its trades. The investment bank 16 will identify the amount of the trades and the respective investors. The master custodian 20 will preferably cross-reference trade-related data with investor data previously received from the investment bank 16 and further with investor's 18 financial accounts. By evaluating financial accounts, the master custodian can confirm whether capital has been released to investment banks 16. If capital has been released, then assets can be allocated as collateral.

Similar to validating assets, all data submitted which regards the day's trades must conform to rules, for example specific fields must be present, duplicate trades are unacceptable, and trade-related data must be recognizable. Specific rules are similarly fashioned for handling data with anomalies. In the preferred embodiment, trades with expired maturity dates or missing grades coupon spreads are subject to rules which are defined by the master custodian 20 and/or the investment bank 16 to handle such conditions. Preferably, trades with expired maturity dates are permitted.

Pricing Assets

Collateral management system 2 must price assets prior to allocating them as collateral to secure trades. There are preferably three sources of pricing employed by the system: vendor pricing, seller pricing and forced pricing. Details regarding these three pricing sources are now discussed.

Vendor Pricing

Vendor pricing is a method of pricing an asset using, in part, indices received from a recognized pricing service. Typically, one pricing service will be used for a specific asset grade, and different pricing services can be used for different asset grades. Asset pricing is performed periodically (e.g., daily) from a list of assets. The list of assets preferably includes pertinent data including a CUSIP number, a coupon rate, a maturity date, current balance and price percentage. The CUSIP (Committee on Uniform Security Identification Procedures) number is a classification of the asset which identifies the issuer and type of asset, for example, GNMA mortgages. The coupon rate is the interest rate applied to the asset. The maturity date is the date that the asset is scheduled to be fully paid. Collateral management system 2 uses the information from the assets list to retrieve indices from a recognized pricing service, for example Bloomberg.

After price indices are retrieved by a pricing service, a series of steps is performed for each non-rejected asset.

In the first step of vendor pricing, a discounted coupon rate determined by subtracting the coupon spread from the asset coupon rate (Discounted Coupon Rate=Asset Coupon Rate−Coupon Spread). The coupon spread value is taken from the grade definition file 22 (FIG. 7) and is preferably per grade or per a subset of a grade.

In the second step, the asset is matched to an indexed asset with similar characteristics. The system will select indexed assets of the same type as the asset, e.g., GNMA, FNMA or FHMA/FHLMC whose maturity dates are within a specified range. The range of maturity dates is also retrieved from the grade definition file 22. The coupon rate of indexed assets which is equal to or closest to (without exceeding) the asset's coupon or discounted coupon rate is selected. The asset is now considered "matched." If more than one matching asset is found, the lowest index is preferably used as the matched index. If no matching asset is found, then the asset cannot be priced automatically.

In step 3, collateral management system 2 applies a price spread and/or a price discount (retrieved from the grade definition file 22) to the matched index to arrive at a Final Percentage Index: Final Percentage Index=(Matched Index−Price Discount)*Price Spread.

In the fourth and final step of vendor pricing, the market value of the asset is calculated. The market value is calculated by multiplying the current balance of the asset (e.g., if the asset is a mortgage with an unpaid balance of $95,000.00, its current balance is $95,000.00) by the Final Percentage Index (Market Value=Asset Current Balance*Final Percentage Index).

Seller Pricing

A second source of pricing employed by collateral management system 2 is seller pricing. A seller price is a price of an asset which is agreed to in advance between the investor 18 and the investment bank 16 for any given asset or grade of assets. The seller price is preferably submitted by the investment bank 16 in the asset data file that is transmitted to the master custodian 20. Seller pricing may or may not be agreed to by the investment bank 16 and/or investor 18 as indicated in their respective grade definition files and/or investor profiles.

Forced Pricing

The third alternative pricing source is forced pricing. Forced pricing is preferably identified in the grade definition file 22 and applies a default index value (FIG. 7) and used in lieu of an index supplied by a pricing service. The default index value is used in the calculation of a market value of the assets. In the example shown in FIG. 7, the investment bank 16 indicates that 96.5 is the forced price index to be applied for any grade B assets. When the default index is retrieved, a Final Percentage Index is determined (Final Percentage Index=(Default Index−Price Discount)*Price Spread). Further, the market value is calculated (Market Value=Final Percentage Index*Current Balance).

Of course, investment bank 16 and/or investor 18 can elect to accept an asset's face value without further manipulation of its price. It is likely however that investors 18 and investment banks 16 will want their trades over-collateralized. Over-collateralizing provides a dual benefit: investors 18 are assured their trades are fully collateralized, and investment banks 16 are assured they have sufficient collateral to provide for investors. Collateral management system 2 provides for flexible pricing techniques and assures investors 18, investment banks 16 and the master custodian 20 of confidence and accountability.

Pre-Allocation

Once assets have been priced according to instructions provided in the grade definition file 22, the master custodian 20 preferably provides the investment bank 16 with a file that includes the assets received, the assets' respective market values, and some indicator identifying whether the assets have been accepted, accepted with a mismatch or rejected. This file, referred to herein as a cleansed file, is used by the investment bank 16 to further identify assets which are eligible for pre-allocation.

In the preferred embodiment, the investment bank 16 will retrieve the cleansed file from the master custodian 20 and use the data therein to generate and transmit a pre-allocation file to the collateral management system 2. Upon receipt, the pre-allocation file will be further subjected to the master custodian's 20 Validation rules. For example, trades identified for pre-allocation and transmitted by the investment bank 16 preferably correspond with the master custodian's 20 list of valid trades. Further, pre-allocated assets must be properly priced and any pre-allocated asset cannot be allocated more than once. The pre-allocated asset should have a corresponding asset grade which matches the desired grade of the specific trade or within a list of grades defined by a specific investor 18.

If, after pre-allocation, the liability is not fully collateralized, then collateral management system 2 continues allocating assets to the liability using the general asset allocation pool and applying rules with respect to the investor profile 24 and the investment bank's 16 grade definition file 22 as described below.

Allocation

After pre-allocation has been completed, or if no pre-allocation is used, the collateral management system 2 allocates a sufficient number of additional assets (which have not been rejected during the validation process and which have not been allocated during pre-allocation) to fully collateralize the liability in accordance with the allocation rules agreed to be the investment bank 16 and the investor 18. The process of allocating assets is preferably preformed for each investment bank 16.

The system is designed to collateralize each liability with assets valued as close to the amount of the liability (plus an identified margin percentage) as possible. The allocation can take place one trade at a time or a plurality of trades can be simultaneously allocated. A separate allocation can be made for each trade with a given investor 18 or all of the trades of the investor can be allocated together.

Figure 9:
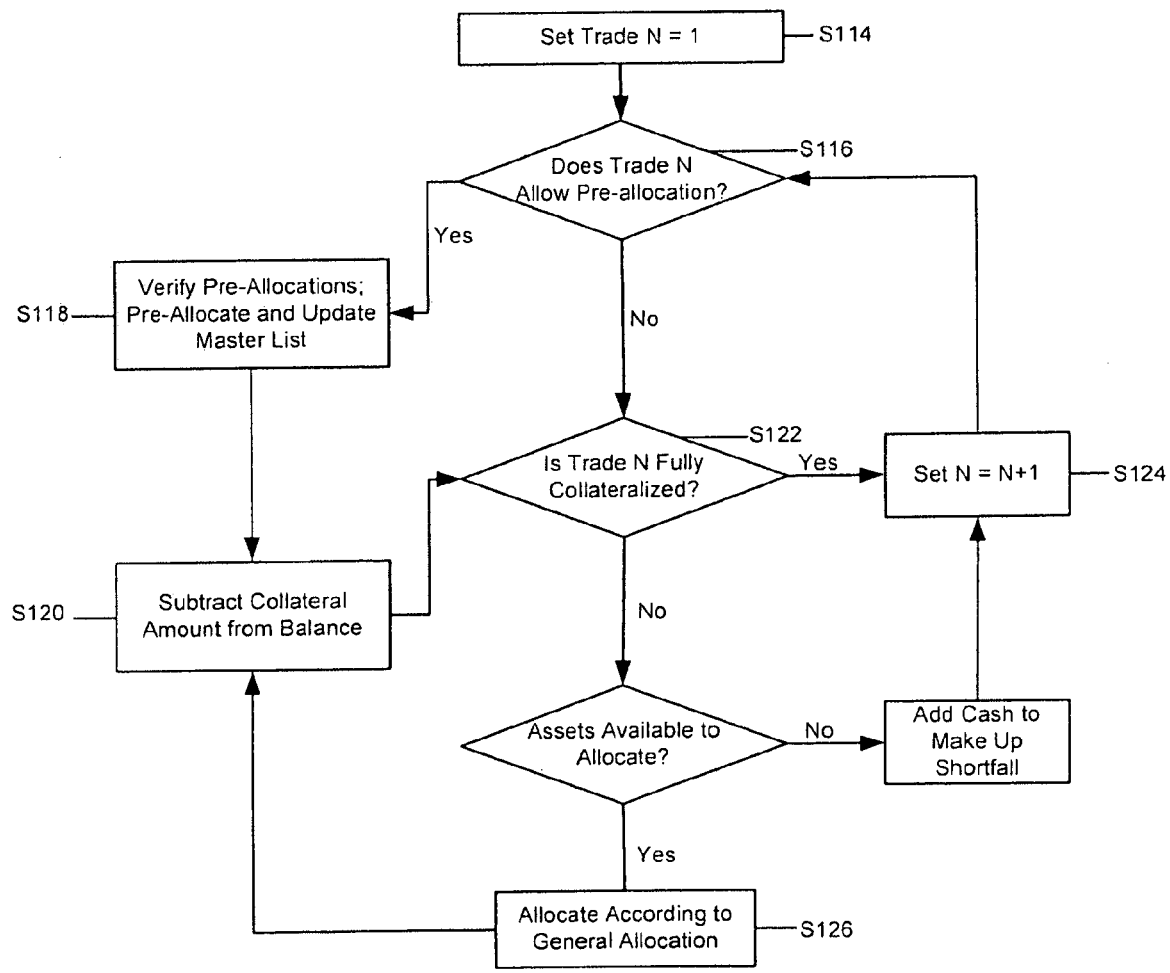
FIG. 9 is a flowchart describing the steps involved with allocating assets.

A first embodiment of the allocation process is illustrated in FIG. 9. In this embodiment, each trade is fully allocated before the next trade is allocated (although groups of trades can be combined and allocated as a single trade).

Referring to FIG. 9, collateral management system 2 initializes a variable, N, which represents the current trade and which increments each time a new trade (or group of investor trades allocated as a single trade) is being allocated. At the outset of the process, N is preferably initialized to some starting value, for example 1 (Step S114).

During the allocation process, collateral management system 2 refers to the investment bank's 16 grade definition file 22 to determine whether trade N provides for pre-allocation (Step S116). If pre-allocation is indicated, then collateral management system 2 pre-allocates the trades with verified assets and proceeds to update its inventory files to indicate that the assets in question have been pre-allocated (Step S118). Further, collateral management system 2 subtracts the value of pre-allocated collateral from the trade's (or investor's) total outstanding balance (Step S120).

In the event that trade N does not provide for pre-allocation, then collateral management system 2 determines whether the trade is fully collateralized (Step S122). If trade N has an outstanding balance which is less than or equal to 0, then trade N is fully collateralized and N is incremented to provide allocation for the next identified trade (Step S124).

If trade N has an outstanding balance then a determination is made whether validated assets of an appropriate grade are available for allocation (Step S126). If assets are not available, then cash is added to make up the shortfall (Step S128). If assets are available, then the allocation proceeds according to the general allocation rules described above (S130). After an asset is applied to a trade for collateral, collateral management system 2 subtracts the collateral amount from the trade's outstanding balance and assesses the trade's (or investor's) newly calculated outstanding balance (Step S120).

Collateral management system 2 continues to determine if the trade (or group of trades) is fully collateralized (Step S122). If the trade is fully collateralized, then the system skips down to step S124, increments the index N and proceeds to allocate the next outstanding trade. The process preferably continues until sufficient assets are allocated to fully collateralize the trade.

In the embodiment of FIG. 9, each trade is fully collateralized before the next trade is allocated. In an alternative embodiment, a plurality of different trades (whether trades of the same inventor or trades of different investors) are collateralized at the same time.

In this embodiment, the allocation process moves back and forth between a plurality of trades as a function of which trade has the highest outstanding balance of unallocated liability at any given time.

In a simple illustrative example, two trades (designated as Trade I and Trade II) must be collateralized. Trades I and II can be with the same investor or with two different investors. Trade I involves a $1,400,000 liability and accepts grade B and grade C assets (in that order). Trade II involves a $600,000 liability and accepts grade B and grade D assets (in that order). There are five grade B assets (B1-B5): B1 has an assigned price of $600,00; B2 has an assigned price of $400,000; B3 has an assigned price of $500,000; B4 has an assigned price of $200,000 and B5 has an assigned price of $100,000. There are two grades C assets: asset C1 has an assigned price of $500,000 and asset C2 has an assigned price of $200,000. Finally, grade D has two assets: asset D1 has an assigned price of $75,000 and asset D2 has an assigned price of $25,000.

The allocation process is initiated by determining which of the two trades has the highest outstanding balance. Since no allocations have been made yet, Trade I has the largest outstanding balance ($1,400,000) and is allocated first. The largest grade B asset is B1 ($600,000) and is allocated to Trade I, reducing its outstanding balance to $800,000 ($1,400,000-$600,000). Trade I still has the largest outstanding balance ($800,000) and is selected again. The largest unallocated grade B asset, B3 ($500,000), is allocated to Trade I, reducing Trade I's outstanding balance to $300,000 ($800,000-$500,000). Trade II now has the largest outstanding balance ($600,000) and is scheduled for allocation. The largest unallocated grade B asset is B3 ($400,000) and is allocated to Trade II. Trade II's outstanding balance is reduced to $200,000 ($600,000-$400,000). Trade I now has the largest outstanding balance ($300,000) and the next highest grade B asset will be allocated to it. The next highest grade B asset is asset B4 ($150,000) which is allocated to the outstanding balance of Trade I, reducing the outstanding balance of Trade I to $150,000.

Trade I still has the highest outstanding balance but there are no longer any grade B assets. The collateral management system 2 examines the grade definition file and the investor profile for the investor of Trade I and determines that the next grade of asset accepted for Trade I is grade C. The largest grade C asset is asset C1 ($200,000) which is allocated to Trade I, thereby fully allocating (indeed, over-allocating) the trade. At this point, Trade II has the highest outstanding balance but there are no longer any grade B assets to allocate. The collateral management system 2 examines the grade definition and investor files and determines that the investor for Trade II will accept grade D assets. The largest grade D asset is D1 ($75,000) which is applied to the outstanding balance of Trade II, reducing the outstanding balance of $25,000. Finally, the remaining grade D asset, asset D2 ($25,000) is applied to Trade II, thereby fully collateralizing the trade.

In the foregoing simple example, it was assumed that the haircut percentage and the margin percentage were both zero for asset grades B, C and D. If the haircut percentage was other than zero, then the price value of assets in any given grade would be reduced by a percentage equal to the haircut for that grade. For example, if a 5% haircut is applied to grade B, then assigned price of asset B1 would be reduced by 5% to $570,000.

If the margin was not zero, then the outstanding balance would be increased by an amount equal to the margin for the grade being allocated. In the example given above Trade I was collateralized with assets B1, B3, B4 and C1. The outstanding balance (originally $1,400,000) would be increased to 105% of the actual outstanding balance (i.e., to $1,470,000). Once all of the available grade B assets have been allocated to Trade I, the actual outstanding balance would be $150,000. This balance would be increased by a percentage (110%) equal to the margin percentage for grade C assets. Thus, the outstanding balance would be increased from $150,000 to $165,000.

In the preferred embodiment, the assets are allocated as a function of the value assigned to each individual asset. Each time an asset is to be allocated, the system selects the asset as a function of the individual price of the asset selected and the individual prices of other assets which are available for allocation (i.e. it selects the asset of the grade in question which has the highest assigned price). However, the invention is not so limited. Assets can be allocated in any order based upon any selection process desired and need not be allocated based upon the individual priced assigned to any specific asset. For example, the assets can be selected based upon the date that the assets were acquired, as a function of the sequence in which the assets appear in a database, or even randomly. However, it is preferable that the allocation be some function of the prices assigned to the assets. For example, even if the assets are allocated randomly, the allocation process would continue until the cumulative value of the prices assigned to the allocated assets reach a desired value, normally equal to or greater than the amount to be collateralized.

Output

The master custodian 20 preferably provides data files and reports to the investment banks 16 and investors 18 after the pricing and allocation process are complete. Each investment bank 16 preferably receives a report showing all of its assets, the prices assigned to those assets (where prices have been assigned) and an indication of which assets have been allocated to which trades. This enables the investment bank 16 to have a clear understanding of its assets, their values and how they have been used to collateralize their various liabilities.

Each individual investor gets a separate report which shows the specific assets which have been allocated to its trade (whether by pre-allocation or automated allocation). A portion of a sample investor allocation report 28 is shown in FIG. 10.

Report 28 indicates that the investor is General Electric and that the trade 96CU670 uses residential loans as collateral. The allocation was made on Dec. 5, 2001 (the production date). The loan was in the amount of $87,000,000 find had to be over-collateralized to the "required amount" of $93,090,000.

The report 28 also lists the various assets which have been applied to the liability including both pre-allocated and allocated assets. Various information concerning each asset including, inter alia, the coupon rate, price, discount, face amount and market value are shown in the report. While only ten assets are listed in the portion of the report illustrated in FIG. 10, the full report which shows all of the assets (totaling at least $93,090,000) which were allocated to the liability.

Manual Front-End

A user-interface is preferably available which enables a user who does not possess great technical expertise to perform many of the above-described processes in collateral management system 2. This interface (hereinafter referred to as the "manual front-end") can be used to, for example, add new assets, add new or modify existing grade definition files and investor profiles. These processes can preferably be done without the need for a time-consuming, full system update. Considering the volume of assets, transactions and investments involved with a plurality of investment banks 16, investors 18 and primary custodians 14, the demands on system resources to perform a complete system update are not trivial. The manual front-end enables ad hoc data entry while alleviating the need to perform a resource-intensive and lengthy system update of collateral management system 2.

A discussion of the features provided by the manual front-end is now provided.

Occasionally, an investment bank 16, investor 18 or other associated party will provide modifications or additions to data stored in collateral management system 2. For example, additions or modifications to grade definition files and investor profiles are submitted and, using the manual front-end, the changes are entered. Changes regarding acceptable grades of assets, price discounts, margins and a desired sequence of grades during an allocation process can be made using the manual front-end. Further, new asset grades can be added to investor profiles and/or grade definition files.

The manual front-end further enables the addition of new assets to be entered in collateral management system 2. When new assets are added via the manual front-end, the assets are validated and appropriately priced using pricing schemes as noted above, e.g., vendor pricing, seller pricing and forced pricing. If an asset is to be priced using seller pricing, for example, after the asset is retrieved and validated, a recognized pricing service, e.g., Bloomberg, is searched to provide an index. Additional calculations, for example, determining a coupon rate, matching the asset and applying a price spread and/or discount can also be performed using the manual front-end. When the pricing of asset is completed, the asset is stored in collateral management system 2 and is available for future allocation. Alternative pricing schemes, as noted above, are also available using the manual front-end. For example, the manual front-end provides for seller pricing and forced pricing, and further enables a classification of the asset, e.g., the asset is restricted for pre-allocation purposes. Preferably, changes entered via the manual front-end are made substantially in "real time" and do not require a large updating processes to record a relatively small number of changes.

The manual front-end also provides improved reporting capabilities of collateral management system 2. For example, users can select from a variety of reporting options and produce reports which can be delivered to the respective parties either electronically or physically. For example, asset allocation summary reports, investor reports, billing reports, collateral reports, discrepancy reports, liability reports, and the like are available to be produced by users operating collateral management system 2 via the manual front-end.

The manual front-end provides a convenient way to maintain profiles, add new assets and perform many of the associated tasks required therefor. By using the manual front-end, the voluminous database managed by the master custodian 20 does not have to be updated and reprocessed frequently during the course of a day. Instead, users have direct access to the data in "real time" and provide up to the minute adjustments to assets, trades, associated parties and the like.

Operations Background

The master custodian 20 has the responsibility of monitoring the time periods for all associated collateral assets. For example, each day the primary custodian 20 analyzes whether the thirty to forty-five day time period for a particular mortgage has expired.

If the investment bank 16 repurchases the asset according to the agreement between the investment bank 16 and the investor 18, then the investor 18 has the option to realize a full return on his investment and receive the full amount of his investment preferably with interest. In the alternative, the investor 18 can leave his investment in a deposit account and new collateral can be assigned by the master custodian 20 to maintain a new security interest. The decision to leave the investor's 18 investment in a deposit account after expiration of an agreement is referred to as "rolling".

The present invention provides great flexibility and accuracy in collateral management. By allocating specific assets as collateral to investments, confidence and accountability increases in the market. Additionally, the present invention provides for standardization of collateral management with otherwise disparate parties working in a uniform way. Each investment bank 16 and investor 18 define the processes and allocations to be performed which increases the integrity of the master custodian's data resources.

In addition to increased confidence, the present invention serves to provide for asset warehousing for existing and newly emerging asset classes.

The invention has been described wherein the collateral assets are typically in the form of mortgages. However, the invention is not so limited; many different types of assets can be managed by collateral management system 2 and used for securing trades. For example, automobiles, apparel, art, technology and intellectual property rights can be used to secure trades. Essentially, any set of assets can be used to secure trades.

As used herein, the term "liability" refers to any commercial obligation such as a debt, a promise to repurchase assets or any potential loss.

As used herein, the term "asset" refers to any item of economic value (except cash) including, without limitation, securities, mortgages, accounts receivable, real property, intellectual property, options, futures, stocks, etc.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed:

1. A computer-implemented process for allocating specific assets from a pool of assets to secure a liability, the process comprising:
    storing in at least one database, information related to a pool of assets and trade information concerning a trade;
    performing, by a processor, the operations of:
        receiving the information concerning each of the assets in the pool of assets, information for at least some of the assets in the pool of assets having been received from at least two sources;
            receiving trade information concerning a trade in which an owner of the pool of assets accepts a liability and agrees to secure the liability with a subset of the pool of assets;
        applying a set of validation rules to the information for each asset in the pool of assets and to the trade information before allocating the subset of the non-rejected assets as collateral for the liability and rejecting those assets which do not meet the validation rules;
        assigning a price to each non-rejected asset;
        classifying the non-rejected assets in the pool of assets into grades; and
        allocating the subset of the non-rejected assets to the liability as a function of the assigned prices and the classified grades to collateralize the liability.

2. The process of claim 1, wherein the allocation is made as a function of the cumulative value of the assigned prices of the allocated assets.

3. The process of claim 1, wherein the allocation is made as a function of both the individual price assigned to each of the allocated assets and the cumulative value of the prices assigned to the allocated assets.

4. The process of claim 1, wherein the allocation is made as a function of the individual prices assigned to the allocated assets, the individual prices assigned to other non-rejected assets which are not allocated, and the cumulative value of the prices assigned to the allocated assets.

5. The process of claim 1, wherein the allocation is made as a function of the individual price assigned to each allocated asset.

6. The process of claim 1, wherein the allocation is made as a function of the individual prices assigned to each allocated asset and the individual prices assigned to other non-rejected assets which are not allocated.

7. The process of claim 1, wherein the grades are divided into acceptable and non-acceptable grades and the allocation is made only from the acceptable grades.

8. The process of claim 1, wherein the non-rejected assets in a given acceptable grade are selected as a function of the prices assigned to the assets in that grade.

9. The process of claim 1, wherein the non-rejected assets in any acceptable grade are selected in the order of their assigned price from highest to lowest.

10. The process of claim 9, wherein the acceptable grades include at least a first grade and a second grade and wherein the assets in the second grade are not selected until there are no non-rejected assets left in said first grade.

11. The process of claim 1, wherein the acceptable grades include at least a first grade and a second grade and wherein the assets in the second grade are not selected until there are no non-rejected assets left in said first grade.

12. The process of claim 7, wherein a front end system is used to manually indicate which grades are acceptable.

13. The process of claim 11, wherein a front end system used to manually indicate which grade is the first grade to be allocated and which grade is the second grade to be allocated.

14. The process of claim 1, wherein some of the non-rejected assets are assigned a price as a function of their fair market value and other of the non-rejected assets are priced by an alternative method.

15. The process of claim 14, wherein the alternative method assigns prices to the non-rejected assets as a function of preset prices.

16. The process of claim 1, wherein the price assigned to at least some of the non-rejected assets is determined as a function of the fair market value of those assets.

17. The process of claim 16, wherein the fair market value is determined with reference to an agreed to standard.

18. The process of claim 16, wherein the fair market value is determined as a function of an industry accepted standard.

19. The process of claim 16, wherein each non-rejected asset is classified by grade and the fair market value of each non-rejected asset which is priced as a function of its fair market value is also priced as a function of its grade.

20. The process of claim 1, wherein the grades are manually assigned to at least some of the non-rejected assets using a front end system.

21. The process of claim 19, wherein the price assigned to at least some of the non-rejected assets in any given grade is determined as a function of their fair market value and a respective discount selected for that grade.

22. The process of claim 21, wherein the discount for each grade is determined by a respective factor which is manually selected using a front end system.

23. The process of claim 18, wherein the industry accepted standard is a publicly available set of indices corresponding to different types of assets, and wherein any index which does not fall within a predetermined range is rejected.

24. The process according to claim 23, wherein the range is selected by the owner of the pool of assets.

25. The process of claim 1, further including periodically providing a report to second party showing him the specific assets which have been allocated to his trade.

26. The process of claim 1, wherein some of the non-rejected assets are assigned a price which is agreed to by both the owner of the assets and the second party and other of the non-rejected assets are assigned a price as a function of an agreed to objective standard.

27. The process of claim 26, wherein the agreed to objective standard attempts to determine the fair market value of the asset.

28. The process of claim 27, wherein the agreed to objective standard is a series of indices, each index varying as a function of the fair market value of assets which are similar to the asset to which a price is being assigned.

29. The process of claim 28, wherein the agreed to standard is also a function of one or more over collateralization factors.

30. The process of claim 29, wherein the one or more over collateralization factors are agreed to between the owner of the asset and the investor.

31. The process of claim 29, wherein the one or more over collateralization factors are used to discount the prices assigned to at least some of the non-rejected assets.

32. The process of claim 1, wherein the received information concerning the pool of assets is a plurality of asset information files have a plurality of fields and wherein the validation rules require that any asset which does not have a required field be rejected.

33. The process of claim 32, wherein the required field is considered missing if either the field itself does not exist or if the field exists but no information is contained in that field.

34. The process of claim 1, wherein the validation rules require that duplicate assets be rejected.

35. The process of claim 1, wherein the information concerning the pool of assets is received both from an owner of the assets and from at least one other source and wherein any asset identified by the owner of the assets, but not identified by at least one of the at least one other source, is rejected.

36. The process of claim 35, wherein the at least one other source is one or more sub-custodians who maintain information concerning the assets owned by an owner of the pool of assets.

37. The process of claim 36, wherein the received information concerning the assets includes a plurality of asset information files containing a plurality of required fields and wherein the validation rules require that the information contained in the required fields be valid information.

38. The process of claim 37, wherein one of the required fields is an asset type and the valid information is any one of a set of defined asset types.

39. The process of claim 1, wherein first and second asset information files containing asset information for the same asset are received from at least two sources.

40. The process of claim 39, wherein a predetermined set of mismatching rules are followed to correct any discrepancies between the first and second asset information files.

41. The process of claim 1, wherein the received information includes a plurality of asset information files each of which include a plurality of required fields and wherein a predetermined set of rules are followed to complete missing fields.

42. The process of claim 41, wherein two of the required fields are a coupon rate and a maturity date of the assets, and the predetermined set of rules require that a default coupon rate be used when the coupon rate field is empty and that a default maturity date be used when the maturity date field is empty.

43. The process of claim 1, wherein the non-rejected assets are not allocated if the trade is not validated.

44. The process of claim 1, wherein the received information concerning the trade is in the form of a plurality of fields and wherein the set of validation rules require that the trade be rejected if any required field is invalid.

45. The process of claim 44, wherein a required field is invalid when it is missing.

46. The process of claim 45, wherein a required field is also invalid when it is empty.

47. The process of claim 46, wherein a required field is also invalid when it does not contain acceptable information.

48. The process of claim 44, wherein a required field is invalid when it is empty.

49. The process of claim 44, wherein a required field is invalid when it does not contain acceptable information.

50. The process of claim 1, wherein the trade is considered to be valid even if it has an expired maturity date.

51. The process of claim 1, wherein at least some of the nonrejected assets are assigned a price as a function of their fair market value.

52. The process of claim 51, wherein the fair market values are determined with reference to an industry accepted standard.

53. The process of claim 46, wherein the at least some of the nonrejected assets are classified into industry accepted categories for which independent pricing information is available and wherein the prices of such non-rejected assets are priced as a function of such independent pricing information.

54. The process of claim 51, wherein at least some of the nonrejected assets have a coupon rate and wherein the prices assigned to those assets are determined as a function of the coupon rate.

55. The process of claim 54, wherein a discounted coupon rate is determined for at least some of the assets having a coupon rate.

56. The process of claim 55, wherein the discounted coupon rate is determined by subtracting a respective coupon spread from each coupon rate.

57. The process of claim 56, wherein the assets are classified into a plurality of grades and the coupon spread is a function of the grade of the asset.

58. The process of claim 52, wherein the prices of at least two of the non-rejected assets are assigned as a function of both their coupon rate and maturity date.

59. The process of claim 58, wherein the price assigned to each asset of the at least two of the non-rejected assets is determined as a function of a discounted coupon rate for such asset, the discount rate being determined by applying a coupon spread to the coupon rate for that asset.

60. The process of claim 58, wherein an attempt is made to assign a price to each of the at least two assets by, for each such asset:

examining an independent source's list of similar assets to select a subset of the independent source's list of assets which have a maturity date that falls within a certain range of the maturity date of the asset to which a price is being assigned;

identifying those assets of the subset of similar assets which have a coupon rate which is closest to, but does not exceed, the discounted coupon rate of the asset to which a price is being assigned;

determining a matched price as being equal to the lowest price of the so identified similar assets; and assigning the price of the asset to which a price is being assigned as a function of the matched price.

61. The process of claim 60, wherein the matched price is expressed as a decimal number indicating either a discounted value which is less than one or an enhanced value which is greater than one.

62. The process of claim 61, wherein the matched price is discounted.

63. The process of claim 62, wherein the price assigned to the asset is determined by multiplying a remaining balance of the asset by the discounted matched price.

64. A computer-implemented system for allocating specific assets from a pool of assets to secure a liability, the system comprising:

at least one database, the at least one database storing information related to a pool of assets and trade information concerning a trade;

a master custodian computing system including at least one processor for performing the operations of:

receiving the information concerning each of the assets in the pool of assets, information for at least some of the assets in the pool of assets having been received from at least two sources;

receiving trade information concerning a trade in which an owner of the pool of assets accepts a liability and agrees to secure the liability with a subset of the pool of assets;

applying a set of validation rules to the information for each asset in the pool of assets and to the trade information before allocating the subset of the non-rejected assets as collateral for the liability and rejecting those assets which do not meet the validation rules;

assigning a price to each non-rejected asset;

classifying the non-rejected assets in the pool of assets into grades; and allocating the subset of the non-rejected assets to the liability as a function of the assigned prices and the classified grades to collateralize the liability.

65. The system of claim 64, wherein the allocation is made as a function of the cumulative value of the assigned prices of the allocated assets.

66. The system of claim 64, wherein the allocation is made as a function of both the individual price assigned to each of the allocated assets and the cumulative value of the prices assigned to the allocated assets.

67. The system of claim 64, wherein the allocation is made as a function of the individual prices assigned to the allocated assets, the individual prices assigned to other non-rejected assets which are not allocated, and the cumulative value of the prices assigned to the allocated assets.

68. The system of claim 64, wherein the allocation is made as a function of the individual price assigned to each allocated asset.

69. The system of claim 64, wherein the allocation is made as a function of the individual prices assigned to each allocated asset and the individual prices assigned to other non-rejected assets which are not allocated.

70. The system of claim 64, wherein the grades are divided into acceptable and non-acceptable grades and the allocation is made only from the acceptable grades.

71. The system of claim 64, wherein the non-rejected assets in a given acceptable grade are selected as a function of the prices assigned to the assets in that grade.

72. The system of claim 64, wherein the non-rejected assets in any acceptable grade are selected in the order of their assigned price from highest to lowest.

73. The system of claim 70, wherein the acceptable grades include at least a first grade and a second grade and wherein the assets in the second grade are not selected until there are no non-rejected assets left in said first grade.

74. The system of claim 73, wherein a front end system is used to manually indicate which grades are acceptable.

75. The system of claim 64, further including periodically providing a report to second party showing him the specific assets which have been allocated to his trade.

76. The system of claim 64, wherein the non-rejected assets are not allocated if the trade is not validated.

77. The system of claim 64, wherein the received information concerning the trade is in the form of a plurality of fields and wherein the set of validation rules require that the trade be rejected if any required field is invalid.

\* \* \* \* \*